C. A. PERKINS.
BIRD BOX OR HOUSE.
APPLICATION FILED MAR. 14, 1917.
1,258,703.
Patented Mar. 12, 1918.
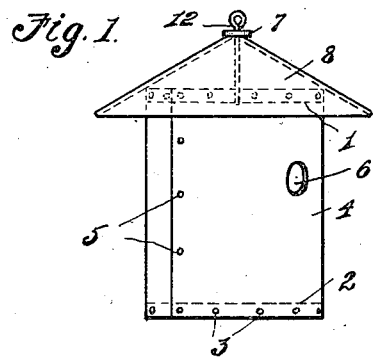
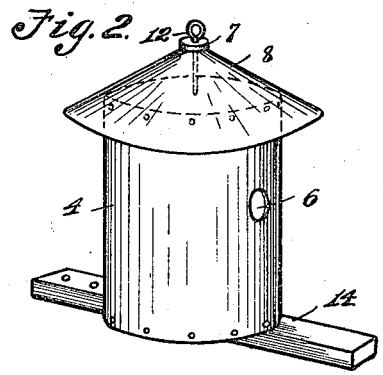
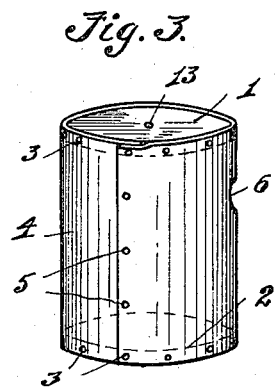
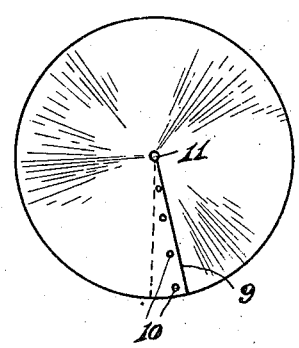
Chester A. Perkins.
INVENTOR.
By George J. Ottsch
ATTORNEY.

UNITED STATES PATENT OFFICE.

CHESTER A. PERKINS, OF SOUTH BEND, INDIANA.

BIRD BOX OR HOUSE.

1,258,703.

Specification of Letters Patent.

Patented Mar. 12, 1918.

Application filed March 14, 1917. Serial No. 154,828.

*To all whom it may concern:*

Be it known that I, CHESTER A. PERKINS, a citizen of the United States, residing at South Bend, in the county of St. Joseph and State of Indiana, have invented certain new and useful Improvements in Bird Boxes or Houses, of which the following is a specification.

My invention relates to a bird house or box which is simple in structure, attractive in appearance, and of a structure which is durable and capable of withstanding the weather, same being more especially adapted for outside use. A further object resides in the provision of a bird house or box constructed of parts which are easily fashioned so as to permit quantity production at a low cost, and which may be easily and quickly assembled.

The invention in the preferred form of details will be described in the following specification, reference being had particularly to the accompanying drawings, in which:—

Figure 1 is a side elevation of a bird box embodying the invention.

Fig. 2 is a perspective view showing a modified form thereof.

Fig. 3 is a perspective view of the box proper before the top or roof is applied.

Fig. 4 is a plan of the top or roof.

Fig. 5 illustrates the parts utilized in attaching the top or roof to the box.

As illustrated, I prefer to make the box cylindrical in form, and to that end employ circular wooden disks 1 and 2, forming the upper and lower ends of the cylindrical structure. Tacked or nailed to the periphery of said disks, as at 3, and forming the side wall of the box, is a previously formed cylindrical member 4, which is preferably made of water-proofed roofing material, such as socalled asphalt roofing shingles, which are made of a fiber impregnated with asphalt to withstand the weather, and which are of the proper dimension and sufficiently flexible to permit same being bent into cylindrical form, and provide a box of the desired dimension. As shown, the ends of the shingle are overlapped and held together by means of rivets 5, the wooden ends being applied after the cylindrical member is formed, and the latter tacked or nailed to the ends along its marginal edges, as heretofore explained. The cylindrical member 4 is provided with an opening 6 to provide entrance to the box, the same being preferably formed by making a circular cut through the material, and using such cut out portion as a washer 7.

In forming the top or roof, I also prefer to use water-proofed sheet fabric, a sheet 8 of the fabric being cut circular in outline and provided with a slit 9 extending from its center point to its outer edge, so that, when the respective marginal edges formed by making the slit, are overlapped, as shown in Fig. 4, the same will be dished, and as applied provides a circular sloping roof. The overlapping edges of the sheet may be held together by means of rivets 10, or secured in any other suitable manner. The top or roof is provided with a central aperture 11, to receive a screw-threaded eye-bolt 12, which is screwed into the upper end 1 of the cylindrical member, said end being provided with a bore 13 to facilitate the application of the bolt. The washer 7, through which the bolt passes, is applied between the top and the eye of the bolt, as shown in Fig. 1, and by means of which bolt and the manner of its connection with the end, the top may be tightly drawn to place upon the box, the eye of the bolt at the same time serving as a means for attaching a cord, wire, or other suitable means for suspending the box from a tree or other support. By passing the bolt through the top and connecting same with the end of the box, the latter supports the top, so that through the instrumentality of the bolt the box proper and the top will always be held firmly together, as the top has no weight to support. As shown in Fig. 2, the box may be provided with a perch 14, to which the box is nailed or otherwise secured, same preferably being of wood and extending beyond the opposite sides of the box, one end serving as a perch and the opposite end for attaching same to a support.

While the foregoing is the preferred form of my invention, I desire it to be understood that I do not limit myself to the precise structure shown and described, as it is obvious that the same may be variously modified without departing from the spirit of the invention.

What is claimed is:

1. A bird box, comprising a receptacle having end members, a sheet forming the sides bent to conform to the edge contour of said ends and attached thereto, an entrance opening in the sheet, a sloping top of sheet fabric mounted on the receptacle, and suspending means for the box extending through the top into engagement with the upper receptacle end, whereby the top is wholly supported by the receptacle when suspended by said means and also held against displacement by the same means.

2. A bird box, comprising a receptacle having end members, a part forming the sides consisting of flexible sheet material bent to conform with the edge contour of the ends and secured thereto, said sheet material having an entrance opening, a top of sheet material conically formed to give same rigidity and mounted on one of the receptacle ends, and a threaded rod extending through the apex of the top and engaging the receptacle end for drawing and securing the top against said end.

In testimony whereof I affix my signature.

CHESTER A. PERKINS.

Copies of this patent may be obtained for five cents each, by addressing the "Commissioner of Patents, Washington, D. C."